United States Patent
Chuchin et al.

[11] 4,104,244
[45] Aug. 1, 1978

[54] METHOD FOR PROTECTION VINYL POLYMERS FROM THERMO-OXIDATIVE DESTRUCTION

[76] Inventors: Alexandr Evgenievich Chuchin, Petrovsko-Razumovsky proezd, 20, kv. 52; Leonid Leonidovich Proskurin, 2 Sinichkina ulitsa, 26, kv. 76, both of Moscow, U.S.S.R.

[21] Appl. No.: 543,048

[22] Filed: Jan. 22, 1975

[51] Int. Cl.$^2$ .............................................. C08K 5/01
[52] U.S. Cl. ...................... 260/45.7 R; 260/45.95 G; 260/844; 260/848; 260/874; 260/896; 260/897 R; 260/901
[58] Field of Search .......... 260/887, 45.7 R, 45.95 G, 260/844, 848, 874, 896, 897 R, 901

[56] References Cited
U.S. PATENT DOCUMENTS

| | | | |
|---|---|---|---|
| 2,420,862 | 5/1947 | Chambers | 260/45.7 R |
| 3,202,729 | 8/1965 | Roberts | 260/887 |
| 3,892,815 | 7/1975 | Scherling | 260/45.7 R |

*Primary Examiner*—Melvyn I. Marquis
*Attorney, Agent, or Firm*—Haseltine, Lake & Waters

[57] ABSTRACT

The method for protection of vinyl polymers from thermo-oxidative degradation in adding to the vinyl polymers inhibitors, viz., poly(arylene alkylenes) having the general formula $+Ar_1+(CH_2)_k+_m\ AR_2+(CH_2)_k\ Ar_1+_n$, where $Ar_1$ and $Ar_2$ are

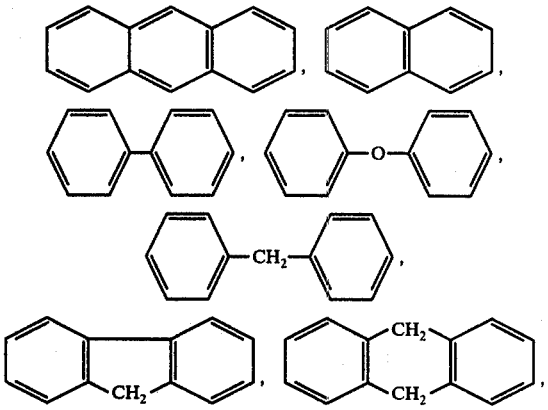

$m+n=2$ to 30, $k=1$ or 2; if $k=1$, then $Ar_1$ and $Ar_2$ are also

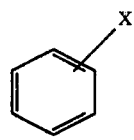

where $X$ = H; or $C_1$ - $C_4$ alkyl; or their hydroperoxides taken in the quantity from 0.01 to 10 per cent of the weight of vinyl polymers. The proposed method ensures prolonged and effective protection of vinyl polymers from thermo-oxidative degradation.

10 Claims, No Drawings

METHOD FOR PROTECTION VINYL POLYMERS FROM THERMO-OXIDATIVE DESTRUCTION

This invention relates to methods of protecting vinyl polymers, for example, poly(methyl methacrylate), poly(butyl methyl methacrylate), polystyrene, copolymer of methylmethacrylate with styrene, polyethylene, polypropylene, polyisobutylene, from thermo-oxidative degradation by using inhibitors. This protection becomes necessary in processing and practical use of said polymers at elevated temperatures.

Known in the prior art are methods of protecting vinyl polymers from thermo-oxidative degradation by adding thereto inhibitors of various types, among which are mainly phenols, aromatic amines, sulphur-, and phosphorus-containing compounds.

Most inhibitors used in the prior art to protect polymers from thermo-oxidative degradation are low-molecular weight substances that are volatile at elevated temperatures, and hence toxic.

The absence of stability in some inhibitors, for example, in aromatic amines, at elevated temperatures, is responsible for their decomposition, on account of which the polymers, containing such inhibitors, are intensely colored.

All these disadvantages limit the field of application of the known inhibitors to a rather narrow range of temperatures and a short time within which they prove effective.

Moreover, known inhibitors of thermo-oxidative degradation of vinyl polymers are chemically active substances, they contain hydrolytically unstable groups, and hence are destroyed and washed out with water or aqueous solutions of acids and alkalis. This, in turn, contaminates liquids, for example, water that contacts the vinyl polymer containing the inhibitor (for example, during transportation of liquids through pipe-lines made of said polymer), and lowers the inhibitor concentration in the polymer.

The object of this invention is to develop a method for prolonged and effective protection of vinyl polymers from thermo-oxidative degradation.

In accordance with this and other objects, the invention consists in adding to the vinyl polymers inhibitors, viz., poly(arylene alkylenes), having the general formula $+Ar_1+CH_2)_k]_m Ar_2[(CH_2)_k Ar_1]_n$, where $Ar_1$ and $Ar_2$ are

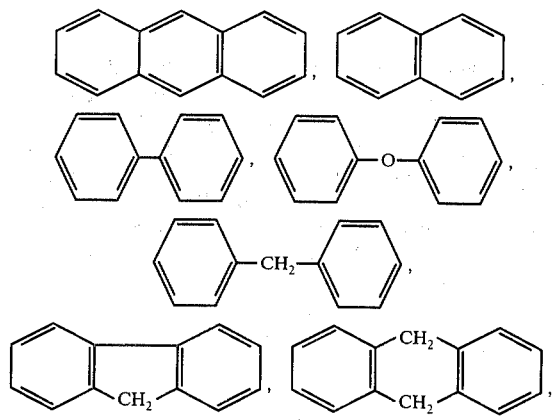

$m + n = 2$ to 30, $k = 1$ or 2; if $k = 1$, then $Ar_1$ and $Ar_2$ are also

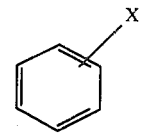

where $X = H$ or $C_1 - C_4$ alkyl; or their hydroperoxides, in the quantity from 0.01 to 10 percent by weight with respect to the weight of the vinyl polymers.

Being aromatic hydrocarbon compounds of sufficiently high molecular weight, poly(arylene alkylenes) of the above formula, and their hydroperoxides, are a new class of inhibitors of thermo-oxidative degradation of vinyl polymers. They have increased thermal stability, i.e., their loss in weight, on account of degradation processes at elevated temperatures, is small, the volatility at elevated temperatures is low, they are insoluble in water and do not react with many chemical substances, for example, with acids or alkalis, due to the absence in them of such functional groups as amines, phenols, and also sulfur-, and phosphorus- containing groups. These characteristics of the novel inhibitors make it possible to ensure prolonged and effective protection of vinyl polymers from thermo-oxidative degradation; in other words, poly(arylene alkylenes), or hydroperoxides thereof, give lengthy and effective stabilization to said polymers.

The length of the protective effect produced by the proposed inhibitors on vinyl polymers, and also the efficiency of the thermo-oxidative protection at the initial and subsequent periods of thermal action, depend, in the first instance, on the concentration of the poly(arylene alkylenes), or their hydroperoxides, in said polymers, and also on their chemical character.

The proposed method can ensure short-time and also lengthy protection of polymers from thermo-oxidative degradation.

Poly(arylene alkylenes), according to the proposed invention, can be prepared by various methods, for example, by the Wurtz-Fitting reaction, in which halogen-aromatic compounds react with halogen-aliphatic compounds; by condensation of formaldehyde with aromatic compounds; by the Friedel-Crafts reaction: (a) by the interaction of methylol-, halogen-alkyl-, or alkoxy-substituted aromatic compounds (for example, benzyl chloride, α-ethoxyethylnaphthalene, corresponding substituted compounds of diphenyl ether) with aromatic compounds that do not contain methylol-, halogen-alkyl-, or alkoxy-alkyl groups (for example, with toluene, diphenyl, naphthalene); by the interaction of 1,2-dichloroethane with aromatic compounds, for example, diphenyl, naphthalene.

Hydroperoxides of said poly(arylene alkylenes) are prepared by oxidizing said poly(arylene alkylenes) with oxygen or oxygen-containing gas.

As has already been said, the proposed method for protection of vinyl polymers from thermo-oxidative degradation consists in adding to them inhibitors, poly(arylene alkylenes) of the above general formula, or their hydroperoxides. The inhibitors can be added to the polymers by any known method, for example, by mixing in a common solvent, in extrusion and calendering processes, by fusing, mixing, etc.

For a better understanding of the invention, the following examples of its practical embodiment are given by way of illustration.

EXAMPLES 1 through 10

The poly(arylene alkylenes) used in these examples were prepared by the action of benzyl chloride on the following aromatic compounds: anthracene, naphthalene, diphenyl, diphenyl ether, fluorene, dihydroanthracene, toluene, ethylbenzene, isopropylbenzene, and tetralin. The molar ratio of benzyl chloride to the above-named aromatic compounds was 80-98: 20-2, respectively. This ratio was varied to prepare poly(arylene alkylenes) having various values m+n. The reaction was carried out in the presence of $SnCl_4$ as a catalyst, taken in the quantity of 1 mole percent with respect to benzyl chloride, at a temperature of 30° – 60° C. The thus prepared poly(arylene alkylenes) were isolated by precipitation from benzene solution into ethyl alcohol. The poly(arylene alkylenes) corresponded to the above general formula, where $Ar_1$ is

$Ar_2$ and m+n are as specified in Table 1 that follows below, and $k$ is 1.

Poly(methyl methacrylate) was prepared by bulk polymerization of methyl methacrylate in the presence of benzoyl peroxide as an initiating agent, taken in the quantity of 0.5 percent of the weight of the monomer, by a step-wise process: for 6 hours at a temperature of 60° C, for 5 hours at 80° C, and for three hours at 120° C.

The obtained poly(methyl methacrylate) was dissolved in benzene, precipitated in hexane, and then the polymer was separated from hexane and dried to constant weight in vacuum at a temperature of 60° C. The molecular weight of the polymer was $8 \times 10^5$.

Then benzene solutions containing 9.5 percent by weight of polymethylmethacrylate and 0.5 percent by weight of the corresponding poly(arylene alkylene) were prepared. 10 ml of benzene solution were placed into an aluminum foil box (45 × 45 × 10 mm) and benzene was removed first by evaporation in air, and then in vacuum.

As a result, poly(methyl methacrylate) specimens, containing 5 percent by weight of the corresponding poly(arylene alkylene) inhibitor were prepared. The specimens were 0.5 mm thick films.

At the same time, there was prepared a control film specimen by casting the benzene solution of poly(methyl methacrylate) free from poly(arylene alkylene) inhibitor.

Thermal stability of the polymers was determined by the loss in weight of the films after their retention in air at a temperature of 220° C. Table 1 characterizes the thermal stability of poly(methyl methacrylate) depending on the concentration of poly(arylene alkylene) therein, and also the thermal stability of the control specimens.

Table 1

| Example No. | $Ar_2$ | m+n | Loss in weight at 220° C in air within four hours, % |
|---|---|---|---|
| 1 | anthracene | 20 | 2 |
| 2 | naphthalene | 5 | 3 |
| 3 | diphenyl | 4 | 16 |
| 4 | diphenyl ether | 30 | 4 |
| 5 | fluorene (−CH₂−) | 6 | 5 |
| 6 | dihydroanthracene (−CH₂−, −CH₂−) | 8 | 5 |
| 7 | toluene (CH₃−) | 7 | 19 |
| 8 | ethylbenzene (CH₂−CH₃) | 4 | 20 |
| 9 | isopropylbenzene (CH(CH₃)₂) | 5 | 25 |
| 10 | tetralin | 5 | 7 |
| Control Specimen | — | — | 60 |

The tabulated data show that the proposed method ensures effective protection of poly(methyl methacrylate) from thermo-oxidative degradation. The thermal stability of poly(methyl methacrylate) stabilized by the method according to the present invention increases 3-30 times (as assessed by the weight loss) as compared to the loss in weight in the control specimens poly(methyl methacrylate) non-protected from thermo-oxidative degradation).

EXAMPLE 11

The poly(arylene alkylene) used in this Example was prepared by the reaction between benzyl chloride and diphenyl ether (at the molar ratio of 80 : 20) in the presence of $SnCl_4$ as a catalyst, taken in the quantity of 1 mole percent, at a temperature of 20° – 30° C. The obtained poly(arylene alkylene) was isolated by precipitation from benzene solution into hexane. It corresponded to the above-stated general formula, where Ar₁ is

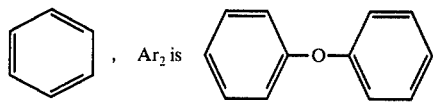

$k$ is 1 and $m+N$ is 5. Poly(butyl methacrylate) was obtained by bulk polymerization of butyl methacrylate in the presence of benzoyl peroxide taken in the quantity of 1 percent of the monomer weight at a temperature of 90° C for 6 hours. The molecular weight of the polymer was $2.7 \times 10^5$.

Next, a specimen of poly(butyl methacrylate) containing 5 percent by weight of said poly(arylene alkylene), and a control specimen of the polymer containing no inhibitor were prepared. The specimens were prepared as described in Examples 1 - 10. After keeping in air at 200° C for 20 hours, the specimen containing the poly(arylene alkylene) lost 20 percent of its weight, while the loss in weight in the control specimen was 70 percent, i.e., 3.5 times as much.

EXAMPLE 12

This example demonstrates the possibility of lengthy protection of vinyl polymers with the use of the proposed method owing to the high thermal stability and low volatility of poly(arylene alkylenes) as compared with the known inhibitors.

Express methods, such as thermal gravitation analysis (TGA), and also assessment of volatility by the loss in weight in vacuum at a temperature of 280° C during 5 hours, revealed considerable advantage of the poly(arylene alkylene), for example one prepared in Example 11, as compared to a rather effective inhibitor of the bisphenol type, viz., Antioxidant 22-46 (Cyanamid, USA):

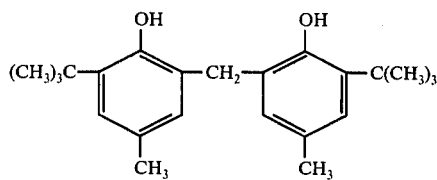

According to TGA data (temperature elevation at a rate of 5-7 degrees per minute), thermal stability of the poly(arylene alkylene) in Example 11 was 400° C (the temperature, characterizing the turn-points in TGA curves), while thermal stability of Antioxidant 22-46 was 250° C, i.e., 150° C lower.

While the loss in weight of the poly(arylene alkylene) in Example 11 was only 1.5 percent by weight after retention in vacuum for 5 hours at a temperature of 280° C, Antioxidant 22-46 was volatilized completely under the same conditions in as little as five minutes.

Described below is the lengthy protective action of the poly(arylene alkylene) (see Example 11), as compared with the protective action of the known inhibitor Antioxidant 22-46, when used to protect poly(methyl methacrylate) from thermo-oxidative destruction.

Two benzene solutions were prepared separately. One of them contained 9.5 percent by weight of poly(methyl methacrylate) prepared as described in Examples 1 through 10, and 0.5 percent by weight of poly(arylene alkylene) prepared as described in Example 11. The other benzene solution contained 9.5 percent by weight of the same polymer and 0.5 percent by weight of the known inhibitor Antioxidant 22-46. Specimens were prepared out of these solutions by a procedure described in Examples 1 through 10. Thermal stability of these specimens (films on an aluminum foil) was assessed by the loss in weight after their keeping in air at a temperature of 200° C for 40 and 90 days. The loss in weight of both specimens kept at the specified temperature for 40 days was almost equal,- about 10 percent. But when the specimens were kept in air at a temperature of 200° C for 90 days, the picture changed markedly. The specimen containing 5 percent by weight of poly(arylene alkylene) lost 12 percent of its weight, while the specimen containing 5 per cent by weight of the inhibitor Antioxidant 22-46, lost, under the same conditions, 40 percent of its weight, that is three times greater.

EXAMPLE 13

The poly(arylene alkylene) hydroperoxide of the poly(arylene alkylene) described in Example 11, was used as an inhibitor of thermo-oxidative degradation of poly(butyl methacrylate) in this Example. The hydroperoxide was obtained by oxidation of the poly(arylene alkylene). To this end, a 25 percent aqueous solution of the poly(arylene alkylene) in ethylbenzene was prepared, and then the initiator of oxidation, viz., azobisisobutyronitrile, taken in the quantity of 10 percent of the weight of the poly(arylene alkylene), was added, and air was bubbled through the solution at a temperature of 75° C for 5 hours. Poly(arylene alkylene) hydroperoxide was isolated by precipitation in ethyl alcohol with subsequent drying in vacuum at a temperature of 40° C to constant weight. The content of active (hydroperoxidic) oxygen was 0.3 percent.

Poly(butyl methacrylate) was obtained by bulk polymerization of butyl methacrylate in the presence of benzoyl peroxide, taken in the quantity of 1 percent of the monomer weight, at a temperature of 90° C for 6 hours. The molecular weight of the obtained polymer was $2.7 \times 10^5$.

Then, a specimen of poly(butyl methacrylate) containing 5 percent by weight of said poly(arylene alkylene) hydroperoxide and a control specimen containing no inhibitor, were prepared. The specimens were prepared by the procedure described in Examples 1-10. The specimens were kept in air at a temperature of 200° C for 10 hours. The loss in weight of the specimen containing the hydroperoxide was 16 percent, while the control specimen lost 50 percent of its weight under the same conditions.

EXAMPLE 14

The poly(arylene alkylene), used in this Example, was prepared by the interaction between p-methoxymethyldiphenyl ether and diphenyl ether, taken at the molar ratio of 90:10, in the presence of SnCl₄ as a catalyst, taken in the quantity of 1 mole percent with respect to p-methoxymethyldiphenyl ether, at a temperature of 120° - 140° C. The obtained poly(arylene alkylene) was isolated by precipitation from benzene in methyl alcohol. Said poly(arylene alkylene) corresponded to the above general formula, where

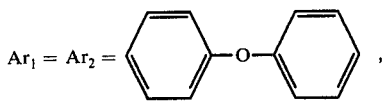

$k = 1$, and $m+n = 12$. Then, a 20 percent solution of the obtained poly(arylene alkylene) in toluene was prepared, azobisisobutyronitrile was added to the solution in the quantity of 10 percent of the poly(arylene alkylene) weight, and the solution was oxidized by bubbling air therethrough at a temperature of 90° C for 7 hours. Poly(arylene alkylene) hydroperoxide was isolated by distilling toluene in vacuum at a temperature of 55° C. The content of active oxygen in the hydroperoxide was 0.6 percent.

Poly(methyl methacrylate) was prepared by polymerization of methyl methacrylate in the presence of the initiator of polymerization, viz., benzoyl peroxide, taken in the quantity of 0.1 percent of the monomer weight. The polymerization conditions were as follows keeping for 2 hours at a temperature of 75° C, for 6 hours at a temperature of 130° C. The molecular weight of the obtained polymer was $7.4 \times 10^4$.

Then a specimen in the form of a film was prepared out of the polymer by a procedure described in Examples 1-10, except that the benzene solution contained 9.9 percent by weight of poly(methyl methacrylate) and 0.1 percent by weight of said poly(arylene alkylene) hydroperoxide. The prepared specimen contained 1 percent by weight of poly(arylene alkylene) hydroperoxide. A control specimen was also prepared by casting a film from the benzene solution of poly(methyl methacrylate) containing no poly(arylene alkylene) hydroperoxide.

After keeping in air at a temperature of 200° C for 1 hour, the specimen containing the hydroperoxide lost 17 percent of its weight, while the control specimen lost 53 percent of its initial weight under the same conditions, that is, three times as much.

EXAMPLE 15

The poly(arylene alkylene) described in Example 14 was mixed with poly(methyl methacrylate) prepared as stated in Examples 1-10. To that end a benzene solution containing 9.9 percent by weight of poly(methyl methacrylate) and 0.1 percent by weight of poly(arylene alkylene) was prepared. 10 ml of the benzene solution were placed in an aluminum foil box (45×45×10 mm) and benzene was evaporated first in air and then in vacuum. Obtained as a result was a specimen of poly(methyl methacrylate), containing 1 percent by weight of poly(arylene alkylene). The specimen was a 0.5 mm thick film.

A control specimen was also prepared by casting a film from the benzene solution of poly(methyl methacrylate), containing no poly(arylene alkylene) additive.

The films were cut into small squares (with about 1 mm side) and the loss in weight was assessed in air with continuous elevation of temperature at a rate of 5.6° per minute. As the temperature of 350° C was attained, the specimen containing poly(arylene alkylene) lost 40 percent of its initial weight, while the control specimen lost 90 percent of its weight.

EXAMPLE 16

A poly(arylene alkylene) of the above general formula where

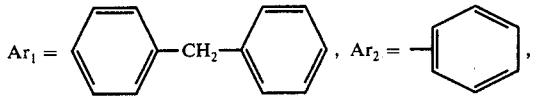

$k = 1$, and $m+n = 2$, was prepared by the interaction of 1 mole of p-chloromethyldiphenylmethane and 0.5 mole of benzene in the presence of 0.01 mole of SnCl$_4$ at a temperature of 25° C. The obtained poly(arylene alkylene) was isolated by precipitation from benzene solution into hexane. Then a 15 percent solution of the poly(arylene alkylene) in isopropylbenzene was prepared, and the oxidation initiator, that is, benzoyl peroxide was added to the solution in the amount of 4 percent of the poly(arylene alkylene) weight, and the solution was oxidized by bubbling air therethrough at a temperature of 110° C for 4 hours. The poly(arylene alkylene) hydroperoxide was isolated by precipitation into ethyl alcohol with subsequent drying in vacuum at a temperature of 40° C to constant weight. The content of active (hydroperoxidic) oxygen was 0.5 percent.

Polystyrene was prepared by polymerizing styrene in the presence of benzoyl peroxide taken in the amount of 1 percent of the monomer weight at a temperature of 80° C for 7 hours. The thus obtained polystyrene was re-precipitated from benzene into hexane, separated from hexane, and dried to constant weight in vacuum at a temperature of 60°–80° C. The molecular weight of the polymer was $2.2 \times 10^5$.

Then a benzene solution containing 9.5 percent by weight of polystyrene and 0.5 percent by weight of said poly(arylene alkylene) hydroperoxide was prepared. 10 ml of the benzene solution were placed into a box (45×45×10 mm) of aluminum foil, and benzene was evaporated first in air and then in vacuum. As a result, a specimen of polystyrene containing 5 percent by weight of said poly(arylene alkylene) hydroperoxide was prepared. The specimen was a 0.5 mm thick film.

A control specimen was also prepared by casting a benzene solution of polystyrene containing no poly(arylene alkylene) hydroperoxide.

The specimens were kept in air at a temperature of 200° C for 6 hours. The specimen containing hydroperoxide lost 10 percent of its initial weight, while the loss in weight of the control specimen was 30 percent.

EXAMPLES 17 and 18

Poly(arylene alkylenes) used in these Examples corresponded to the above general formula where

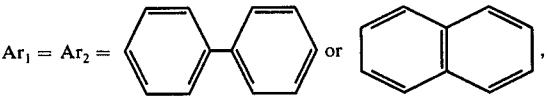

$k = 2$, $m + n = 8$ or $4$. They were prepared by the interaction between diphenyl or naphthalene, with 1,2-dichloroethane (at the molar ratio of 60:40) in the presence of AlCl$_3$ as a catalyst, taken in the quantity of 10 percent of the 1,2-dichloroethane weight, at a temperature of 70°–120° C. The prepared poly(arylene alkylenes) were isolated by precipitation from benzene into ethyl alcohol.

The specimens of poly(methyl methacrylate) molecular weight $8 \times 10^5$) in the form of 0.5 mm thick films were prepared as described in Examples 1 - 10, except that 9.9 percent by weight of poly(methyl methacrylate) and 0.1 percent by weight of the corresponding poly(arylene alkylene) were dissolved in benzene. The specimens of poly(methyl methacrylate), containing 1 percent by weight of the corresponding poly(arylene alkylene) inhibitor were thus prepared. A control specimen of poly(methyl methacrylate), containing no poly(arylene alkylene) was also prepared.

Table 2 shows the loss of weight of the specimens kept in air at a temperature of 220° C for 5 hours.

Table 2

| Example No. | $Ar_1 = Ar_2$ | m+n | Loss in weight after keeping in air at 220° C for 5 hours, % |
|---|---|---|---|
| 17 | biphenyl | 8 | 20 |
| 18 | naphthalene | 4 | 2 |
| Control | — | — | 70 |

Thus, poly(methyl methacrylate) protected from thermo-oxidative degradation by the proposed method lost 3.5 - 35 times less weight under the above conditions compared with the control specimen.

EXAMPLES 19, 20 and 21

The poly(arylene alkylenes) used in these Examples were prepared by the interaction of the corresponding mixtures of aromatic compounds with 1,2-dichloroethane taken at the molar ratio of 60:40. The following mixtures of aromatic compounds were used in these Examples: in Example 19 - a mixture of anthracene with dihydroanthracene, in Example 20 - a mixture of naphthalene with diphenyl ether, and in Example 21 - a mixture of diphenylmethane with fluorene. The molar ratio of the aromatic compounds in these mixtures was 80:20 respectively. The interaction of the said reagents was effected for 2-5 hours at a boiling temperature of the reaction mixture in the presence of AlCl₃ as a catalyst, taken in the quantity of 10-20 mole percent with respect to the mixture of aromatic compounds. Poly(arylene alkylenes) corresponding to the above general formula were thus prepared. The values of $Ar_1$, $Ar_2$, $m + n$, and $k$ are specified in Table 3 for each of the above Examples.

The prepared poly(arylene alkylenes) (PAA) were put together (in quantities specified in Table 3) with poly(methyl methacrylate) prepared as described in Examples 1 through 10, or with poly(butyl methacrylate) prepared as described in Example 11. The corresponding polymer and poly(arylene alkylene) were put together in benzene, and a 0.5 mm thick film was then cast out of this benzene solution. Control specimens of the corresponding polymers, containing no inhibiting additives were also prepared.

Thermal stability of the polymers was assessed by the loss in weight after keeping the specimens in air at a certain temperature for certain periods of time. Table 3 shows the data illustrating the loss in weight of the specimens of polymers protected from thermo-oxidative degradation according to the proposed method as compared with the control specimen.

Table 3

| Ex. No. | Poly(arylene alkylene) (PAA) | | m+n | k | Vinyl polymer | Qty of PAA, % of polymer | Test T, in °C | Test time, hours | Weight loss, % | |
|---|---|---|---|---|---|---|---|---|---|---|
| | $Ar_1$ | $Ar_2$ | | | | | | | Test | Control |
| 19 | anthracene | dihydroanthracene (with CH₂-CH₂) | 3 | 2 | poly(methyl methacrylate) | 1.0 | 220 | 4 | 3 | 72 |
| 20 | naphthalene | diphenyl ether | 5 | 2 | same | 0.5 | 220 | 8 | 4 | 78 |
| 21 | diphenylmethane | fluorene | 4 | 2 | poly(butyl methacrylate) | 1.0 | 200 | 12 | 52 | 70 |

Examples 22 through 30 illustrate the effect of concentration of poly(arylene alkylene) added to the vinyl polymer on the protection efficiency of the polymer from thermo-oxidative degradation in short-time and lengthy thermo-oxidative ageing in air at elevated temperatures.

EXAMPLES 22 through 30

A poly(arylene alkylene) of the above-specified general formula, where

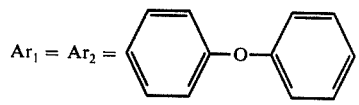

$Ar_1 = Ar_2 = $ diphenyl ether, $k = 1$, and $m + n = 2$, was prepared by the interaction of the product of chloromethylation of diphenyl ether (chlorine content 14.5 percent with diphenyl ether (at the molar ratio of the reagents 50:50) in the presence of AlCl₃ as a catalyst taken in the quantity of 1 mol percent with respect to the product of chloromethylation of diphenyl ether. The process was carried out for 3 hours at a temperature of 20° C, for one hour at a temperature of 100° C, and for thirty minutes at a temperature of 140° C. The obtained poly(arylene alkylene) was isolated by precipitation from benzene into hexane, after which the solvent and the low-molecular weight products were removed by distillation in vacuum by raising the temperature from room temperature to 300° C.

Re-precipitated block-poly(methyl methacrylate) obtained as described in Examples 1 through 10 was put in benzene together with various quantities of poly(arylene alkylene) (PAA) as specified in Table 4. Then, 0.5 mm thick films were cast from the benzene solutions, and a control specimen, containing no poly(arylene alkylene), was also prepared.

Table 4 illustrates the loss in weight of poly(methyl methacrylate) specimens containing various quantities of said poly(arylene alkylene), as compared to the loss in weight of the control specimen after keeping in air at a temperature of 220° C for thirty minutes, 17 hours and 552 hours.

Table 4

| Example No. | PAA qnty, in % of poly(methyl methacrylate) | Loss in weight (in %) of samples of poly-(methyl methacrylate) at a temperature of 200° C. kept in air for: | | |
|---|---|---|---|---|
| | | thirty minutes | 17 hours | 552 hours |
| 22 | 0.1 | 1 | — | 98 |
| 23 | 0.25 | 0 | 5 | 95 |
| 24 | 0.5 | 0 | 0 | 85 |
| 25 | 1.0 | 0.5 | 2 | 80 |
| 26 | 2.0 | 0.5 | 2 | 63 |
| 27 | 3.5 | 0.5 | 2 | 35 |
| 28 | 5.0 | 1 | 4 | 25 |
| 29 | 7.0 | 2 | 7 | 24 |
| 30 | 10.0 | 4 | 10 | 23 |
| Control specimen | — | 12 | 83 | 100 |

EXAMPLE 31

A poly(arylene alkylene) of the above-specified formula, where

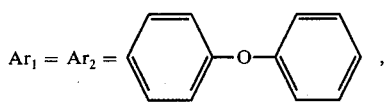

$k = 1$, and $m+n=2$, was prepared by the interaction of α-chloromethylnaphthalene with naphthalene (at the molar ratio of 50:50) in the presence of $SnCl_4$ as a catalyst, taken in the quantity of 1 mol percent of α-chloromethylnaphthalene. The process was carried out at a temperature of 20° C for 4 hours. The obtained poly(arylene alkylene) was isolated by precipitation from benzene into hexane.

0.001 g of said poly(arylene alkylene) and 0.099 g of commercial high-pressure polyethylene having the molecular weight of $28 \times 10^3$ mixed together and fused at a temperature of 160° C. Then, a 0.25 mm thick film was formed between two glass plates, and a control specimen (polyethylene film containing no poly(arylene alkylene) additive) was prepared.

The films were kept in air at a temperature of 160° C for 52 hours. The sample containing poly(arylene alkylene), that is stabilized according to the invention, lost 8 percent of its initial weight, while the loss in weight of the control specimen was 23 percent. Both specimens became colored. The control specimen had a deeper shade which testified to deeper degradation processes that had occurred therein.

Measurement of optical density on a photoelectric colorimeter in a monochromatic green beam of light at $\lambda = 580$ mmn showed that the optical density of the stabilized specimen was 0.56, while the optical density of the non-stabilized specimen was 0.89.

EXAMPLE 32

Stability of commercial polyisobutylene (mol. wt. 40,000) to thermo-oxidative degradation was tested in this Example on a static (monometric) unit. The stability was assessed by consumption of oxygen in the polymer specimens containing poly(arylene alkylene) inhibitor and one containing no such inhibitor (control specimen). The moment when the specimen began consuming oxygen, corresponded to the termination of the induction period, that is the end of the period within which oxygen was not consumed by the specimen.

A solution of 0.01 g of poly(arylene alkylene), described in Examples 22 through 30, in 20 ml of benzene was prepared, and 0.2 ml was charged into a test-tube of the static testing unit, into which 0.02 g of polyisobutylene had already been placed. Benzene was removed by distillation in vacuum and a specimen of the polymer, containing 0.5 percent by weight of poly(arylene alkylene) was thus obtained.

A control specimen of polyisobutylene, containing no poly(arylene alkylene) was prepared simultaneously. To this end, 0.2 ml of benzene (instead of the benzene solution of poly(arylene alkylene)) was placed into another test tube of the testing unit into which 0.02 g of polyisobutylene had already been placed, too. Benzene was removed by evaporation in vacuum similarly.

At 270° C and at an oxygen pressure of 200 mm Hg, the induction period of oxygen consumption for the polymer specimen containing poly(arylene alkylene) was 20 minutes, while for the control specimen the induction period was 5 minutes, that is four times less. The obtained results indicate that under the specified conditions, the specimen, stabilized by the proposed method, is four times more stable with respect to thermo-oxidative degradation than the non-stabilized specimen.

EXAMPLE 33

Stability of commercial low-pressure polyethylene (molecular weight 10,000) to thermo-oxidative degradation was assessed on a static (monometric) testing unit by a procedure similar to that described in Example 32, except that the 0.04 ml of benzene solution of the poly(arylene alkylene) was added to 0.02 g of low-pressure polyethylene. After evaporation of benzene, the specimen of the polymer contained 0.1 percent by weight of poly(arylene alkylene). A control specimen of low-pressure polyethylene was prepared as described in Example 32.

At 170° C and at a pressure of oxygen of 200 mm Hg, the induction period of oxygen consumption by the polymer specimen, containing poly(arylene alkylene)

was 80 minutes, while for the control specimen it was 40 minutes, that is two times less.

EXAMPLE 34

In the present Example, stability of commercial polypropylene (molecular weight $3.5 \times 10^5$) to thermo-oxidative degradation was tested on a static unit. The procedure was the same as described in Example 32, except that 0.08 ml of the benzene solution of poly(arylene alkylene) was added to 0.02 g of polypropylene weighed sample. After evaporation of benzene, a specimen of the polymer containing 0.2 percent by weight of poly(arylene alkylene) was prepared. Simultaneously, a control specimen of polypropylene was also prepared by the procedure described in Example 32.

At a temperature of 180° C. and at an oxygen pressure of 100 mm Hg, the induction period for oxygen consumption by the test specimen of the polymer, containing poly(arylene alkylene) was 20 minutes, and for the control specimen it was 7 minutes, that is almost three times less.

EXAMPLE 35

The poly(arylene alkylene) described in Example 31, was put together with the poly(methyl methacrylate) prepared in Examples 1 through 10. To this end, a benzene solution, containing 9.999 percent by weight of poly(methyl methacrylate) and 0.001 percent by weight of poly(arylene alkylene) was prepared. 10 ml of this solution were placed in a box ($45 \times 45 \times 10$ mm) of aluminum foil and benzene was removed by evaporation first in air and then in vacuum. As a result, a specimen of poly(methyl methacrylate), containing 0.01 percent by weight of poly(arylene alkylene) was prepared. It was a 0.5 mm thick film.

At the same time, a control specimen was cast out of the benzene solution of poly(methyl methacrylate) containing no poly(arylene alkylene) additive.

After having been kept in air at a temperature of 200° C for 2 hours, the specimen, containing poly(arylene alkylene) lost 25 percent of its initial weight, while under the same conditions the control specimen lost 43 percent of its weight.

EXAMPLE 36

A copolymer of methyl methacrylate and styrene was prepared. To this end a mixture of 80 parts by weight of methyl methacrylate, 20 parts by weight of styrene and 0.1 part by weight of benzoyl peroxide was prepared and the copolymerization process was carried out at a temperature of 75° C for 2 hours, at a temperature of 110° C for 4 hours, and finally at a temperature of 130° C for 6 hours. The obtained copolymer was reprecipitated from benzene into hexane, after which the copolymer was separated from hexane and dried to constant weight first in air and then in vacuum at a temperature of 20°–25° C. The molecular weight of the copolymer was $3.6 \times 10^5$.

Next, a benzene solution containing 9.8 percent by weight of the copolymer and 0.2 percent by weight of poly(arylene alkylene) was prepared by the procedure described in Example 11. A 0.5 mm thick film was then cast of this benzene solution, and the thus-obtained copolymer specimen contained 2 percent by weight of poly(arylene alkylene).

At the same time, a control specimen of the copolymer was prepared by casting a film from the benzene solution, containing no poly(arylene alkylene).

After having been kept in air at a temperature of 220° C for 5 hours, the specimen of the copolymer, containing poly(arylene alkylene) lost 7 percent of its initial weight, while the control specimen lost 68 percent of its weight under the same conditions.

What is claimed is:

1. A method for stabilizing a vinyl polymer against thermo-oxidative degradation which comprises incorporating into a previously prepared unstabilized vinyl polymer an inhibitor selected from the group consisting of (1) poly(arylene alkylenes) of the formula:

wherein $Ar_1$ and $Ar_2$ are

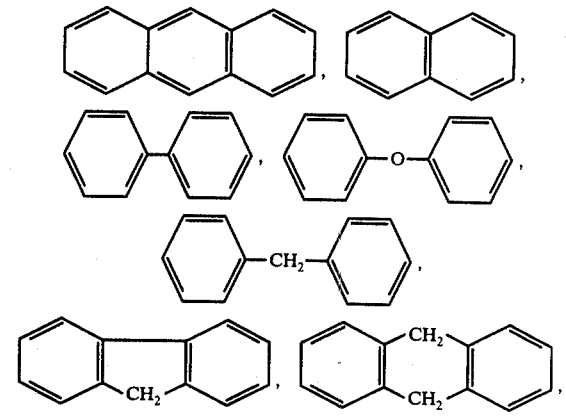

$m + n = 2$ to 30; $k$ is an integer of 1 and 2; and when $k = 1$, $Ar_1$ and $Ar_2$ are also

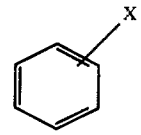

where X is H or a $C_1$-$C_4$ alkyl; and (2) hydroperoxides of said poly(arylene alkylenes); said inhibitor being used in an amount within the range of from 0.01 to 10% by weight of the vinyl polymer.

2. The method of claim 1 which comprises dissolving said unstabilized polymer and said inhibitor in an organic solvent and evaporating said solvent.

3. The method of claim 1 which comprises mixing said unstabilized polymer and said inhibitor and fusing said mixture.

4. The method of claim 1 which comprises extruding together said unstabilized polymer and said inhibitor.

5. The method of claim 1 which comprises calendering together said unstabilized polymer and said inhibitor.

6. The method of claim 1 wherein said vinyl polymer is selected from the group consisting of poly(methyl methacrylate), poly(butyl methacrylate), polystyrene, copolymer of methyl methacrylate and styrene, polyethylene, polypropylene and polyisobutylene.

7. The method of claim 1 wherein the stabilizer comprises the hydroperoxides of said poly(arylene alkylenes).

8. The product obtained by the method of claim 1.

9. The product obtained by the method of claim 6.

10. The product obtained by the method of claim 7.

* * * * *